United States Patent
Priess (10) Patent No.: US 11,293,473 B2
(45) Date of Patent: Apr. 5, 2022

(54) SELF-DRIVING MASONRY ANCHOR

(71) Applicant: Steven Priess, Latham, NY (US)

(72) Inventor: Steven Priess, Latham, NY (US)

( * ) Notice: Subject to any disclaimer, the term of this patent is extended or adjusted under 35 U.S.C. 154(b) by 266 days.

(21) Appl. No.: 16/257,724

(22) Filed: Jan. 25, 2019

(65) Prior Publication Data

US 2020/0240453 A1 Jul. 30, 2020

(51) Int. Cl.
*F16B 25/10* (2006.01)
*F16B 25/00* (2006.01)

(52) U.S. Cl.
CPC ........ *F16B 25/103* (2013.01); *F16B 25/0026* (2013.01); *F16B 25/0052* (2013.01); *F16B 25/0068* (2013.01); *F16B 25/10* (2013.01)

(58) Field of Classification Search
CPC ................ F16B 25/103; F16B 25/0026; F16B 25/0052; F16B 25/0068; F16B 25/10
USPC ..................... 411/387.4, 387.8, 417
See application file for complete search history.

(56) References Cited

U.S. PATENT DOCUMENTS

| | | | | |
|---|---|---|---|---|
| 3,083,609 A | * | 4/1963 | Lovisek | F16B 25/0052 411/386 |
| 3,207,023 A | * | 9/1965 | Knohl | F16B 25/0031 411/387.3 |
| 3,710,676 A | * | 1/1973 | Ringland | F16B 25/103 411/387.7 |
| 3,779,664 A | * | 12/1973 | Caley | B23B 51/02 408/225 |
| 3,933,075 A | * | 1/1976 | Peterson | F16B 25/0084 411/387.7 |
| 4,034,641 A | * | 7/1977 | Williams, Jr | F16B 25/0084 411/387.7 |
| 4,125,050 A | * | 11/1978 | Schwartzman | F16B 25/0084 408/228 |
| 4,257,307 A | * | 3/1981 | Regensburger | F16B 25/0094 408/228 |
| 4,842,467 A | * | 6/1989 | Armstrong | F16B 25/0026 411/386 |

(Continued)

FOREIGN PATENT DOCUMENTS

| | | | | |
|---|---|---|---|---|
| CN | 106931018 A | | 7/2017 | |
| EP | 2444678 A1 | * | 4/2012 | F16B 25/0052 |

OTHER PUBLICATIONS

US 7,007,376 B2, 07/2006, Toback (withdrawn)

(Continued)

*Primary Examiner* — Roberta S Delisle
(74) *Attorney, Agent, or Firm* — Schmeiser, Olsen & Watts, LLP (57) ABSTRACT

A self-driving masonry anchor that includes ahead configured to receive a driving bit, a threaded section extending from the bottom of the head, a drilling section following the threaded section, and a drill tip at the end of the drilling section. The threaded section includes alternating high and low threads. The high threads include notches or serrations. The low threads are double low threads such that there are two low threads between each high thread. The drilling section includes at least two flutes for the removal of debris. The drill tip includes an abrasive material which is different than the material of the drilling section such that the drill tip and drill section predrill a hole in a masonry material for the threaded section, the threaded section fastening to the masonry material.

20 Claims, 5 Drawing Sheets

(56) References Cited

U.S. PATENT DOCUMENTS

| | | | | |
|---|---|---|---|---|
| 4,973,210 A | * | 11/1990 | Osborne | F16B 25/0026 411/107 |
| 5,110,245 A | * | 5/1992 | Hiroyuki | F16B 25/0015 411/417 |
| 5,294,227 A | * | 3/1994 | Forster | F16B 25/0026 411/386 |
| 5,382,195 A | * | 1/1995 | Hiler | F16B 25/0084 409/211 |
| 5,944,295 A | * | 8/1999 | McSherry | F16B 25/103 248/304 |
| 5,957,646 A | * | 9/1999 | Giannuzzi | F16B 25/0026 411/412 |
| 6,250,866 B1 | * | 6/2001 | Devine | F16B 25/0026 411/387.4 |
| 6,976,818 B2 | * | 12/2005 | Levey | F16B 33/02 411/310 |
| 7,070,376 B1 | * | 7/2006 | Toback | F16B 11/006 411/258 |
| 7,160,073 B2 | * | 1/2007 | Mizuno | F16B 25/0031 411/387.4 |
| 7,654,785 B2 | * | 2/2010 | Chen | F16B 25/106 411/421 |
| 8,322,960 B2 | * | 12/2012 | Gong | F16B 25/0047 411/411 |
| 9,228,603 B2 | | 1/2016 | Lin | |
| 9,322,422 B2 | | 4/2016 | Park | |
| D898,557 S | * | 10/2020 | Chen | D8/387 |
| 2004/0156696 A1 | * | 8/2004 | Grosch | F16B 11/006 411/378 |
| 2005/0158149 A1 | * | 7/2005 | Panasik | B21H 3/06 411/411 |
| 2005/0175432 A1 | * | 8/2005 | Su | F16B 25/10 411/417 |
| 2008/0050200 A1 | * | 2/2008 | Su | F16B 25/0015 411/411 |
| 2008/0124188 A1 | * | 5/2008 | Chang | F16B 25/0026 411/387.8 |
| 2009/0169334 A1 | * | 7/2009 | Su | F16B 25/10 411/412 |
| 2009/0214321 A1 | | 8/2009 | Wang et al. | |
| 2010/0047035 A1 | * | 2/2010 | Rosenkranz | F16B 25/0073 411/387.4 |
| 2011/0014007 A1 | * | 1/2011 | Gaudron | F16B 25/0026 411/412 |
| 2011/0176888 A1 | * | 7/2011 | Gaudron | F16B 25/0068 411/394 |
| 2011/0299958 A1 | * | 12/2011 | Lee | F16B 25/0047 411/417 |
| 2013/0058735 A1 | * | 3/2013 | Yu | F16B 25/0068 411/386 |
| 2013/0336744 A1 | * | 12/2013 | Phua | F16B 25/0026 411/387.1 |
| 2015/0316088 A1 | * | 11/2015 | Pearce | F16B 25/103 411/387.7 |
| 2018/0135682 A1 | * | 5/2018 | Gong | F16B 25/0052 |
| 2018/0209465 A1 | * | 7/2018 | Lin | F16B 25/0084 |
| 2019/0309784 A1 | * | 10/2019 | Lajewardi | F16B 25/0026 |
| 2020/0256372 A1 | * | 8/2020 | Hsu | F16B 25/0078 |

OTHER PUBLICATIONS

NPL#1: Concrete Screw Bolt Depot, May 20, 2013, Bolt Depot, <https://web.archive.org/web/20130520174948/https://www.boltdepot.com/fastener-information/anchoring-products/concrete-screw-info.aspx> (Year: 2013).*

* cited by examiner

SELF-DRIVING MASONRY ANCHOR

FIELD OF TECHNOLOGY

The following relates generally to fasteners, such as screws and anchors. More specifically, the following relates to self-driving masonry anchors.

BACKGROUND

Presently, drilling and screwing fasteners into masonry materials requires specific steps and tools to be used. Unlike the process of drilling and screwing fasteners into wood where a number of types of drills and fasteners can be used, working with masonry materials such as cement require specific tools and procedures to successfully drill into and attach fasteners in masonry materials.

Installing fasteners into masonry material is a long and tedious process requiring several steps. First, a hole for the fastener must be pre-drilled into the masonry material using a masonry drill bit. The size masonry drill bit must be carefully chosen to correctly correspond to the size of the fastener being used. If the correct sized drill bit is not used, the fastener will be unable to be securely installed within the masonry material. Second, after the hole is pre-drilled, the hole must be cleared of all debris created by the drilling. Third, the fastener may be screwed into the pre-drilled hole, but must be done slowly to ensure that the threads are correctly aligned with the pre-drilled hole. This process requires that the tool being used be changed (e.g., from a handheld drill to a screwdriver), or that tools on a drill/driver be changed (e.g., from a drill bit to a screwdriver bit).

Thus, a self-driving masonry anchor which reduces the steps and time required to install fasteners into masonry material would be well received in the art.

SUMMARY

According to one embodiment, a masonry anchor comprises ahead configured to receive a driving bit, a first section extending from the head, wherein the first section includes serrated high threads and low threads, such that two low threads are located between each high thread, and a second section extending from the first section, wherein the second section is a double fluted drill section having an abrasive drill tip, the abrasive drill tip includes a first material which is different than a second material within the second section, wherein a diameter of the first section is larger than a diameter of the second section.

According to another embodiment, a self-driving anchor for attaching objects to a masonry material comprises ahead configured to receive a driving bit, a threaded section, wherein the threaded section includes alternating high and low threads, wherein the high threads have notches, a drill section, wherein the drill section has at least two flutes for removing debris of the masonry material, wherein the drill section directly follows the threaded section and has a diameter which is smaller than the threaded section, and a drill tip located at the end of the drill section, wherein the drill tip includes a first material which is harder than the masonry material and different than a second material within the drill section, wherein the drill tip and drill section predrill a hole in the masonry material for the threaded section, the threaded section fastening to the masonry material.

According to another embodiment, an anchor for single penetration applications into a masonry material wherein the anchor does not require the masonry material to be pre-drilled comprises a hex-washer head, a shaft extending from the bottom of the hex-washer head, a threaded section along the shaft wherein the threads extend outward from the outer diameter of the shaft, wherein the threads are alternating high and low threads, the high threads having serrations and the low threads being double low threads, a drilling section along the shaft following the threaded section such that there is no exposed shaft between the threaded section and the drilling section, wherein the drilling section has the same diameter as the shaft, wherein the drilling section comprises at least two flutes for removal of masonry material debris, and a drill tip at the end of the drilling section wherein the drill tip comprises a material which is harder than the masonry material and different than the material of the drilling section, wherein the material of the drill tip is located in the entire drill tip, a coating on the drill tip, or an attachable portion for the drill tip.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
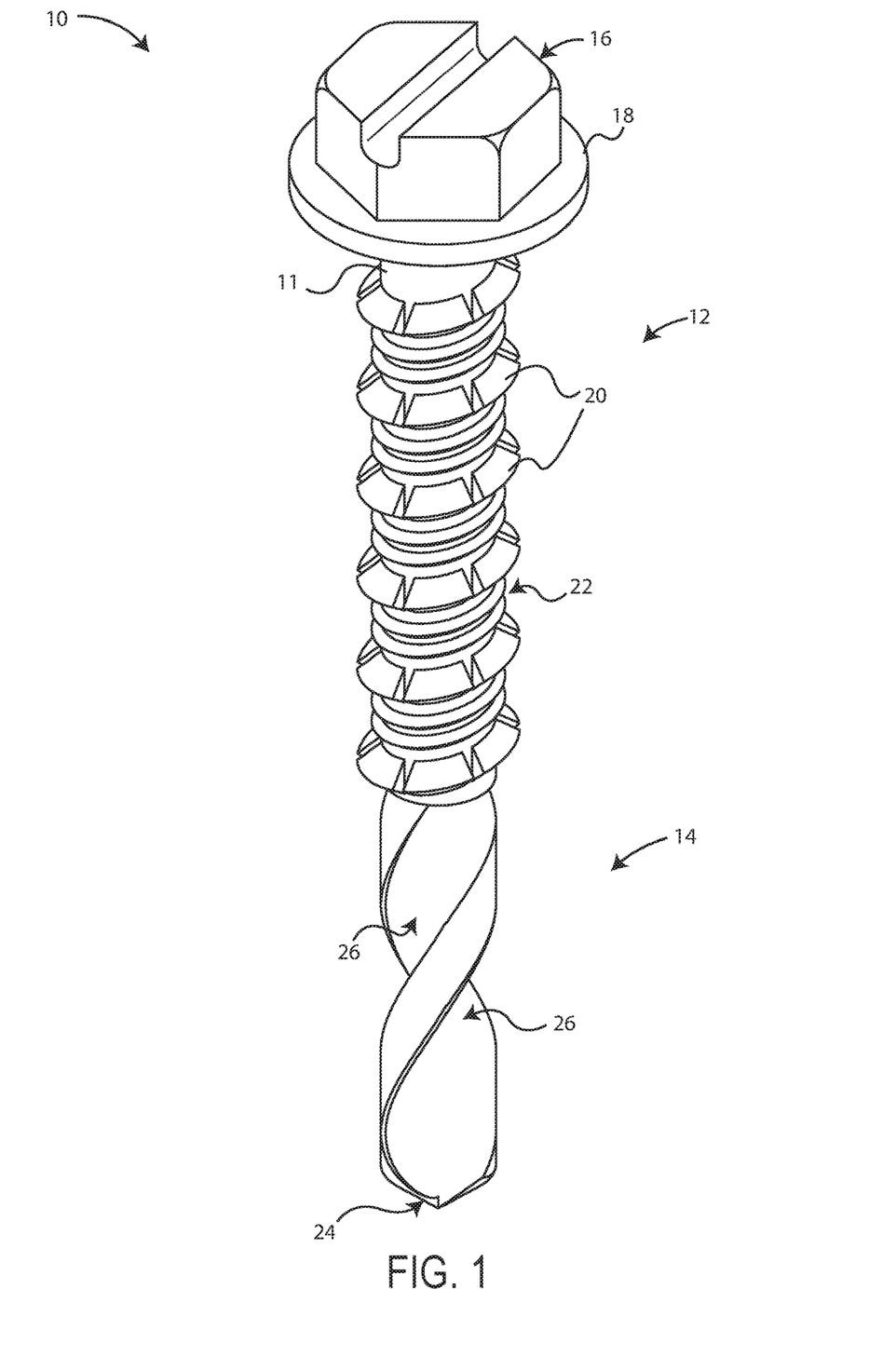
FIG. 1 depicts a perspective view of a self-driving masonry anchor, in accordance with embodiments of the present invention.

Referring to the drawings, FIG. 1 depicts a perspective view of a self-driving masonry anchor 10 in accordance with embodiments of the present invention. The self-driving masonry anchor 10 includes an enlarged head 16. The enlarged head 16 includes a circumferential base 18. The circumferential base 18 may be an integral washer. In some embodiments, the enlarged head 16 may be a hex bolt washer head. The hex bolt washer head may include a slotted screw drive, as shown in FIG. 1. In other embodiments, the enlarged head may be a flat head for flush mount applications. The flat head may be a Phillips drive flat head, a slotted flat head, a Torx flat head or the like. For example, the flat head may be an 82 degree countersunk Phillips drive flat head. It should be understood that the size of the head and the type/style of the head will vary based on the application, tools available to users, and the type of material the self-driving masonry anchor 10 is being fastened in.

Extending from the bottom of the enlarged head 16 is a shank 11. The shank 11 includes a threaded section 12 followed by a drilling section 14. The threaded section 12 includes both high threads 20 and low threads 22. The drilling section 14 includes a double fluted drill extending directly from the end of the threaded section 12 (i.e., there is no exposed smooth shank between the threaded section 12 and the drilling section 14). The drilling section 14 has a drill tip 24 for drilling into masonry material.

Figure 2:
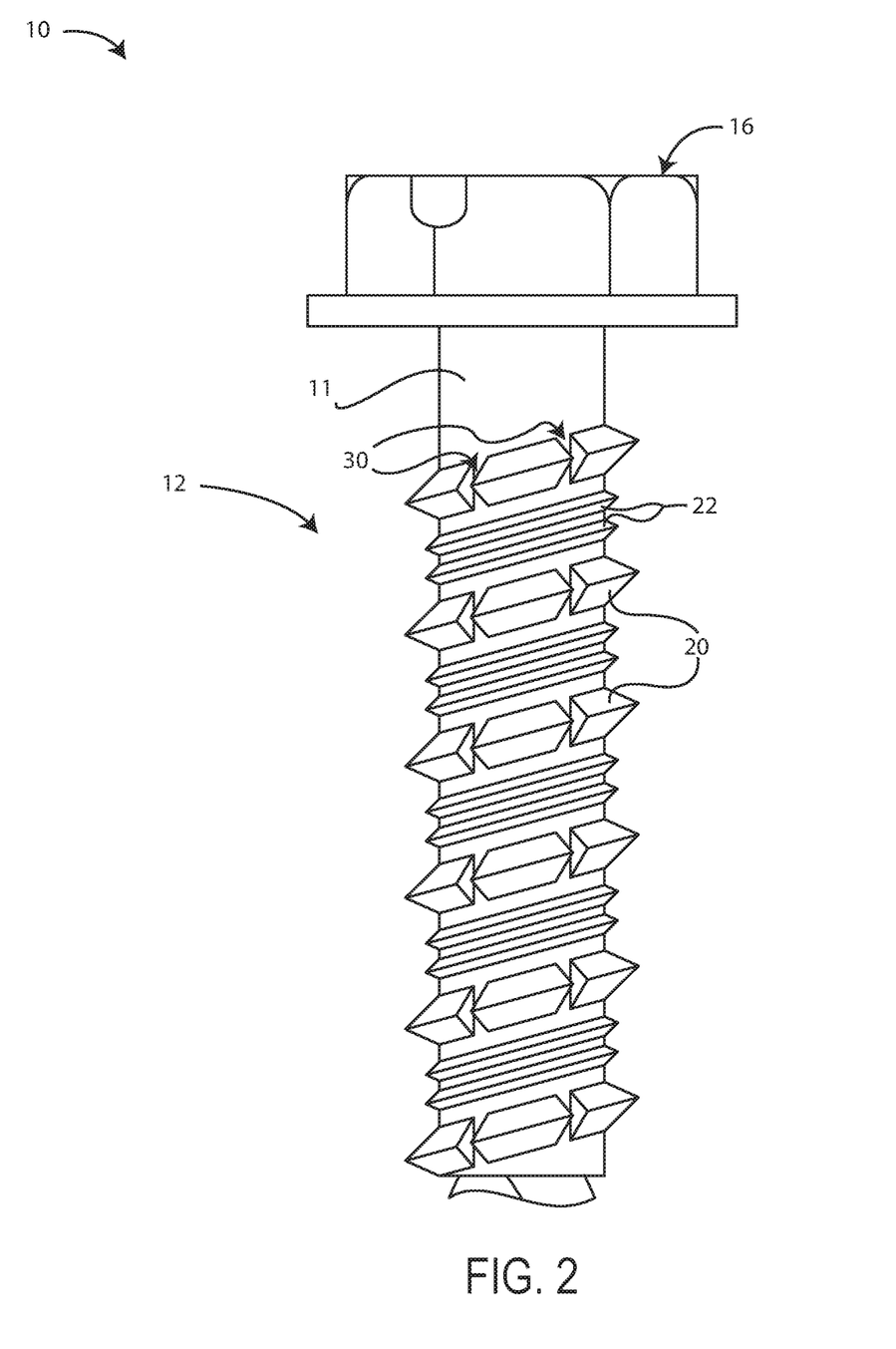
FIG. 2 depicts a threaded section of the self-driving masonry anchor of FIG. 1, in accordance with embodiments of the present invention.

Referring now to FIG. 2, the threaded section 12 of the self-driving masonry anchor 10 is shown. The threaded section 12 includes a high-low double helix thread system which includes high threads 20 and low threads 22. It should be understood that "threads" refers to the helix pattern thread which wraps around the shaft 11. As such, high threads 20 refer to a single helical structure that wraps around the shaft 11 in a helix pattern, whereas the low threads 22 refer to a double helical structure that wraps around the shaft 11. The high threads 20 have a larger thread height than the low threads 22. As shown in FIG. 2, in one embodiment, the high threads 20 are serrated high threads, shown by serrations 30. The serrations 30 provide adding cutting ability to the high threads as they cut into the masonry material. In one embodiment, the serrations 30 extend to the bottom of the high threads 20. In other embodiments, the serrations 30 may extend only partially into the high threads 20. In some embodiments, the serrations 30 may not be desirable, based upon the type of material the anchor is being fastened in to. In those embodiments, the high threads may not include the serrations 30.

Paired with the high threads 20 are low threads 22. The low threads 22, which also run down the shank 11 in a helix pattern, are located between the high threads 20. In one embodiment, as shown in FIG. 2, the low threads 22 are double low threads. Double low threads means that between each high thread 20 there are two low threads 22. In another embodiment, the low threads 20 are single low threads. In other embodiments, the low threads may be closely dotted or spotted threads which follow the same path as the low threads shown in FIG. 2.

The high-low helix thread system is configured to allow for the self-driving masonry anchor 10 to require less effort to drive the anchor into the masonry material while also providing a stronger grip and higher resistance to loosening than conventional thread systems. The high threads 20 are sharper than conventional threads and thus require less energy or force to cut into materials. Paired with the serrations 30, the high threads 20 cut into masonry material faster and with less force required. The low threads provide additional contact points along anchor. The added contact points results in more force being required to remove or loosen the anchor. Additionally, the low threads advantageously assist in the removal of chips created by the drilling section 14. As the chips of masonry material are created and removed by the flutes 26 of the drilling section 14, the low threads 22 are configured to push or guide the chips towards the top of the anchor and the enlarged head 16 such that all of the chips are removed from the drilled hole prior to the self-driving masonry anchor 10 reaching its final position. As the self-driving masonry anchor 10 is rotated or turned into the masonry material, the low threads 22 are configured to guide up the chips along the shank 11. Removing chips from the drilled hole prior to the threaded section 12 fastening into the masonry material ensures secure contact with the masonry material, increasing the surface area which the anchor is contacting and thereby increasing the resistive strength of the anchor.

Figure 3:
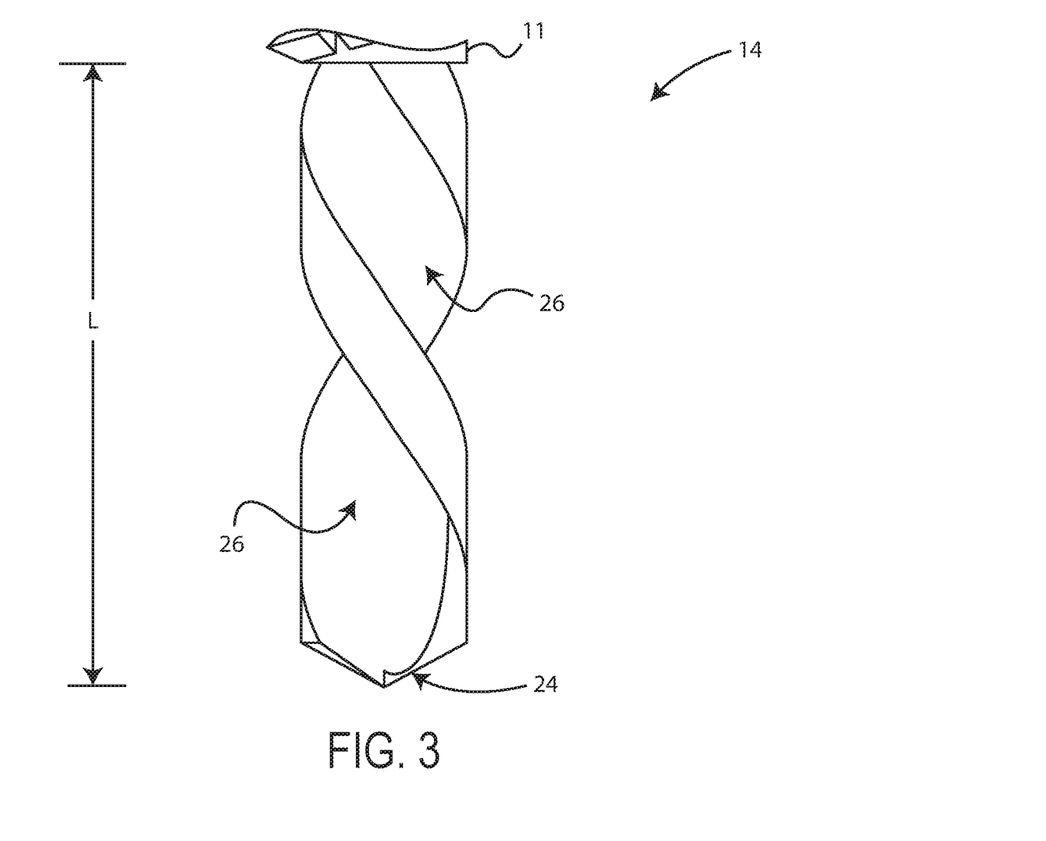
FIG. 3 depicts a drilling section of the self-driving masonry anchor of FIG. 1, in accordance with embodiments of the present invention.

FIG. 3 shows the drilling section 14 of the self-driving masonry anchor 10 of FIG. 1, in accordance with embodiments of the present invention. The drilling section 14 includes two flutes 26 and a drill tip 24. The flutes 26 extend along the length L of the drilling section 14 in a double helix pattern. The length L of the drilling section 14 will vary based on the overall length of the self-driving masonry anchor 10. However, to ensure proper chip removal and that the pre-drilled hole has removed enough material to allow the threaded section 12 to fasten to the material, the length L should be at least ¼ of an inch long regardless of the overall length of the self-driving masonry anchor 10. In another embodiment, the length L should be at least ½ of an inch long. In some embodiments, the length L of the drilling section 14 is equal to the length of the threaded section 12. In other embodiments, the length L of the drilling section 14 is less than or greater than the length of the threaded section 12.

As shown in FIG. 3, the overall diameter of the drilling section 14 remains constant along the length L of the drilling section. The outside diameter of the drilling section 14 is equal to the diameter of the shank 11. In other embodiments, the diameter of the drilling section 14 may not be constant along the length L. For example, in one embodiment, the diameter may taper along the length L. In other words, the diameter at the drill tip 24 may be smaller than the diameter of the shank 11 and the diameter of the drilling section 14 increases along the length L such that the diameter of the drilling section 14 is equal to that of the shank 11 where the drilling section 14 meets the shank 11.

The drilling section 14 includes a drill tip 24. The drill tip 24 is shown as an abrasive drill tip. The abrasive drill tip 24 is specifically designed for drilling hard, abrasive materials, such as concrete or masonry materials. The drill tip 24 may include a material which is different from the rest of the drilling section 14. The different material may be one which has an increased hardness when compared with the material of the drilling section 14. For example, the drill tip 24 may be made entirely of the different material, may include a coating of the different material, or may include an attachable portion of the different material. The attachable portion may be a drill tip made from or coated in the different material, having an opening that is configured to receive an end of the drilling section 14 and thereby serve as the drill tip 24. The different material may have a hardness greater than the hardness of the material which is to be drilled in to. For example, the different material used to drill into masonry material may be cemented carbide. Cemented carbide may be a mix of cobalt and tungsten carbide materials. In other embodiments, the different material may include one of or a combination of the following materials: carbide, tungsten carbide, tungsten, Durium, silicon carbide, cubic boron nitride, Alloy 6B and Cobalt 6B (otherwise known as Stellite®), diamond, and/or corundum and moissanite mineral. The preceding list should not be considered exclusive and is provided for exemplary purposes to show possible materials and combination of materials which may be used with the drill tip 24. Other materials may also be suitable based upon the material which is being drilled in to (i.e., a material which has a hardness greater than the material being drilled in to).

The drill tip 24 may be a twist drill bit, formed by the twists of the flutes 26. In another embodiment, the drill tip may be a drill bit which includes a spade shape or form. The spade shape should be understood to be a pentagon-shaped "house" wherein the bottom is horizontal, the two sides are parallel and perpendicular to the bottom and the top two sides converge to a point. This spade shape has some depth and would be placed through the center of the drill tip 24 such that the point formed by the two top sides of the spade is at the same point as the tip of the drill tip 24. The outer edge of the spade shape (defined by the two parallel sides) extends to the outer diameter of the drilling section 14. In other embodiments, the outer edge of the spade extends past the outer diameter of the drilling section 14.

Figure 4:
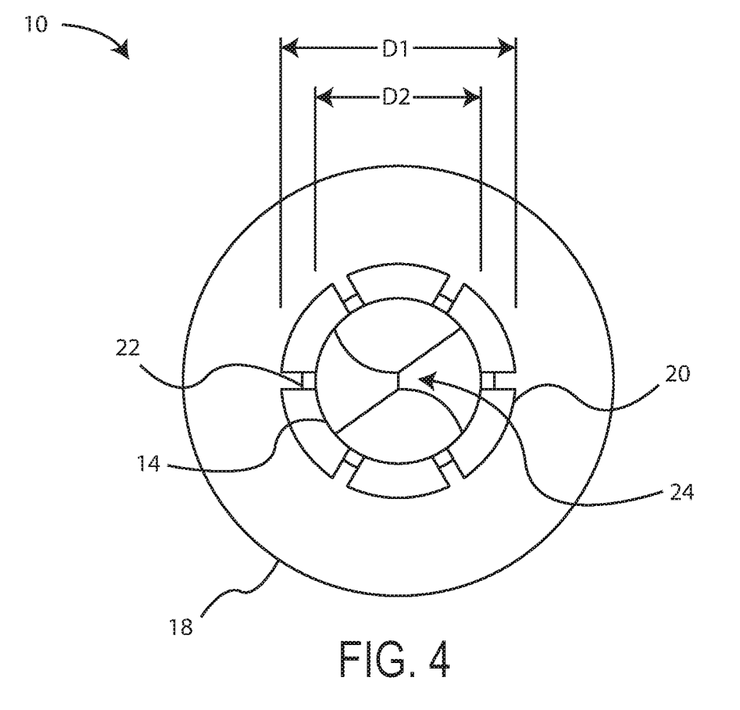
FIG. 4 depicts a bottom view of the self-driving masonry anchor of FIG. 1, in accordance with embodiments of the present invention.

FIG. 4 depicts a bottom view of the self-driving masonry anchor of FIG. 1, in accordance with embodiments of the present invention. The bottom view shown in FIG. 4 shows the diameters of the circumferential base 18, the high threads 20, the low threads 22, and the drilling section 14. FIG. 4 shows a largest diameter D1. The largest diameter D1 is the outermost diameter of the high threads 20. Also shown in FIG. 4 is a diameter D2. The diameter D2 is the diameter of the drilling section 14 and the shank 11. As is shown, the drilling section 14 has the same diameter as the shank 11, which is slightly smaller than the largest diameter D1. In other words, the low threads 22 and the high threads 20 have a slightly larger diameter than the drilling section 14. This allows for a hole to be pre-drilled by the drilling section 14 without removing the material for the threaded section to cut into and fasten to. The largest diameter D1 and the diameter D2 will vary based upon the overall size of the self-driving masonry anchor 10. Generally, the diameter D2 should be ⅟₃₂-⅟₁₆ of an inch smaller than the largest diameter D1. The following table provides examples of corresponding largest diameter D1 and diameter D2 dimensions. The table should not be understood to be limiting. Any number of corresponding diameters may be used so long as the diameter D2 is slightly smaller than the largest diameter D1.

| D1 | D2 |
| --- | --- |
| 3/16" | 5/32" |
| 1/4" | 3/16" |
| 5/16" | 1/4" |
| 3/8" | 23/64" |

Figure 5A:
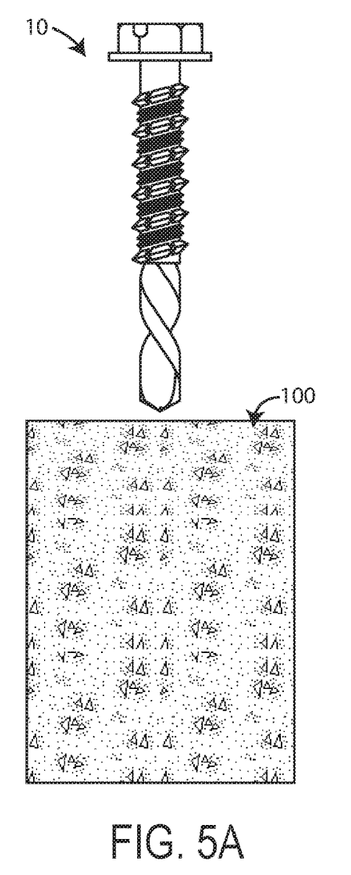
FIG. 5A depicts a fastening environment with the self-driving masonry anchor of FIG. 1 in a first position, in accordance with embodiments of the present invention.
Figure 5B:
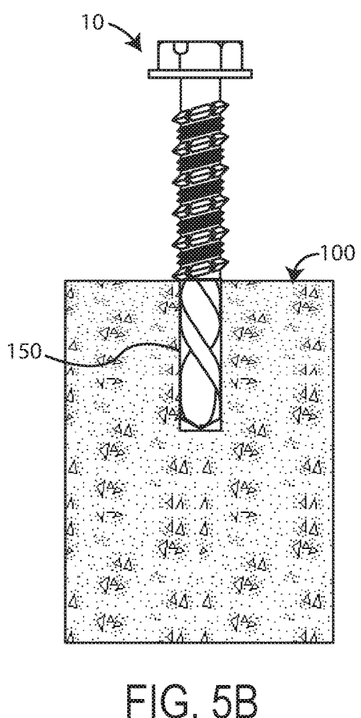
FIG. 5B depicts a fastening environment with the self-driving masonry anchor of FIG. 1 in a second position, in accordance with embodiments of the present invention.
Figure 5C:
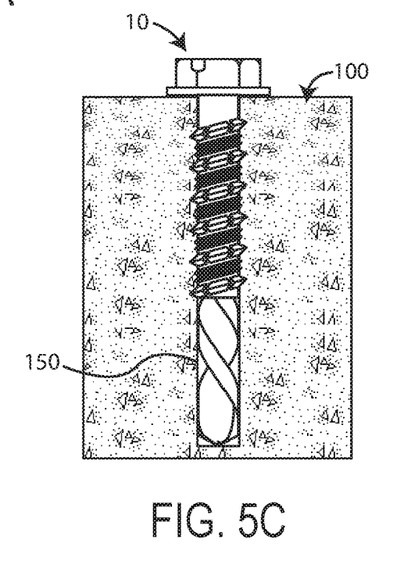
FIG. 5C depicts a fastening environment with the self-driving masonry anchor of FIG. 1 in an installed position, in accordance with embodiments of the present invention.

FIGS. 5A-5C depict a cut-away view of a fastening environment with the self-driving masonry anchor 10 of FIG. 1 in three different positions. Referring to FIG. 5A, the self-driving masonry anchor 10 is shown in a first position. The first position has the self-driving masonry anchor 10 above a desired position in a masonry material 100. The desired position may a position required to fasten or attach an object or other material to the masonry material 100. The masonry material 100 may be any type of masonry material. For example, the masonry material 100 may be concrete, CMU, brick, stone, marble, granite, cast stone, limestone, mortar, grout, stucco, and the like.

FIG. 5B shows the self-driving masonry anchor 10 in a second position. The second position is shown with the drilling section 14 of the self-driving masonry anchor 10 having entered the masonry material 100, producing the drilled hole 150. The self-driving masonry anchor 10 drills into the masonry material 100 by the turning of the self-driving masonry anchor by a drill or driver. As the self-driving masonry anchor 10 drills into the masonry material 100, chips or debris of the masonry material 100 are produced. These may be removed from the drilled hole 150 to facilitate fastening. The flutes 26 of the self-driving masonry anchor 10 guide the chips created towards the top of the drilled hole 150 as the drilling section 14 extends into the masonry material 100. As can be seen in FIG. 5B, the drilling section 14 creates a pre-drilled hole ahead of the threaded section 12.

FIG. 5C shows the self-driving masonry anchor 10 in an installed position. In the installed position, the self-driving masonry anchor 10 has continued to drive into the masonry material such that the threaded section 12 is now fastened into the masonry material. The circumferential base 18 of the self-driving masonry anchor 10 is shown flush against the masonry material 10. However, in other embodiments, an object such as a washer may be fastened or attached between the circumferential base 18 and the surface of the masonry material 100 when the self-driving masonry anchor 10 is in the final position. As can be seen in FIG. 5C, as the self-driving masonry anchor 10 continues to turn and extend into the masonry material 100, the drilling section 14 continues to pre-drill the drilled hole 150 ahead of the threaded section 12. As the threaded section 12 enters the drilled hole 150, the high threads 20 (which have a larger diameter than the drilled hole 150) cut into the edge of the drilled hole 150. The high threads 20 are aided by the serrations 30 as they cut into the masonry material 100. As the self-driving masonry anchor 10 extends further into the masonry material 100, more chips and debris are continually created. The flutes 26 continue to guide or push the chips towards the top of the drilled hole 150. However, after the threaded section 12 enters the drilled hole 150, the chips and debris are guided to the top of the drilled hole 150 by the low threads 22. Once the self-driving masonry anchor 10 reaches the final position, the low threads 22 provide added contacts points to increase the force required to dislodge the anchor 10.

As the self-driving masonry anchor 10 moves from the first position in FIG. 5A to the final position in FIG. 5C the movement of the self-driving masonry anchor 10 may be continuous and smooth. In other words, an advantage of the self-driving masonry anchor is that the anchor is turned or rotated at a constant speed or rotational velocity as the anchor is fastened to the masonry material. As such, the removal of debris or chips as described above occurs as fast as the debris or chips are created. A disruption in the removal of the chips or debris would result in a failure anchor's ability to fasten to the masonry material.

While FIGS. 5A-5C show the self-driving masonry anchor 10 in three separate positions, a stop does not need to be made at the second position shown in FIG. 5B. Moreover, while a number of applications will involve the self-driving masonry anchor 10 fixing or attaching an object to the masonry material, it should be understood that the self-driving masonry anchor 10 generally applies to single penetration applications (i.e., the anchor drills through and fastens to a single material). The embodiment described herein relate to masonry materials; however, it should be understood that the threaded section 12, drilling section 14 and drill tip 24 can be adjusted and modified such that the self-driving masonry anchor 10 is able to be used with a plurality of materials (e.g., wood, metal, plastic, drywall, etc.).

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, it should be understood that the present invention may include any combination of the components, hierarchy and methodology described herein.

The invention claimed is:

1. A masonry anchor comprising:
a head configured to receive a driving bit;
a first section extending from the head, wherein the first section includes serrated high threads and low threads such that two low threads are located between each serrated high thread; and
a second section extending from the first section, wherein the second section is a double fluted drill section having an abrasive drill tip, the abrasive drill tip including a first material that is different from a second material within the second section;
wherein a diameter of the first section is larger than a diameter of the second section,
wherein the serrated high threads include serrations that extend to a bottom of the serrated high thread, wherein the serrations are oriented vertically along a center axis of the masonry anchor, and wherein serrations of the serrated high threads are spaced apart at the bottom of the serrated high thread.

2. The masonry anchor of claim 1, wherein the first material of the abrasive drill tip is at least one of a coating or an attachable portion.

3. The masonry anchor of claim 2, wherein the first material is chosen from at least one of tungsten carbide, cemented carbide, durium, silicon carbide, or cubic boron nitride.

4. The masonry anchor of claim 1, wherein a largest diameter of the first section is between 1/32"-1/16" larger than the diameter of the second section.

5. The masonry anchor of claim 1, wherein a length of the second section is at least 1/4".

6. The masonry anchor of claim 1, wherein the head is a hex washer head or a countersunk Phillip's drive flat head.

7. The masonry anchor of claim 1, wherein the serrated high thread includes six serrations per circumferential flight.

8. The masonry anchor of claim 1, wherein the serrated high threads extend across the entire first section between the head and the second section.

9. The masonry anchor of claim 8, wherein the two low threads are not serrated.

10. A self-driving anchor for attaching objects to a masonry material, the self-driving anchor comprising:
a head configured to receive a driving bit;
a threaded section, wherein the threaded section includes alternating high and low threads, wherein the high threads include serrations, wherein the low threads are double low threads such that there are two low threads located between each high thread, wherein the serrations extend to a bottom of the serrated high thread, wherein the serrations are oriented vertically along a center axis of the masonry anchor, and wherein serrations are spaced apart at the bottom of the serrated high thread;
a drill section, wherein the drill section has at least two flutes for removing debris of the masonry material, wherein the drill section follows the threaded section and has a diameter which is smaller than a largest diameter of the threaded section; and
a drill tip located at the end of the drill section, wherein the drill tip includes a first material which is harder than the masonry material and different than a second material within the drill section;
wherein the drill tip and drill section predrill a hole in the masonry material for the threaded section, the threaded section fastening to the masonry material.

11. The self-driving anchor of claim 10, wherein the double low threads are not serrated.

12. The self-driving anchor of claim 10, wherein the drill tip includes a coating or is an attachable portion.

13. The self-driving anchor of claim 12, wherein the first material of the drill tip is at least one of tungsten carbide, cemented carbide, durium, silicon carbide, or cubic boron nitride.

14. The self-driving anchor of claim 10, wherein the largest diameter of the threaded section is between 1/32" and 1/16" larger than the diameter of the drill section.

15. The self-driving anchor of claim 10, wherein a combined length of the drill section and drill tip is at least 1/4".

16. The self-driving anchor of claim 10, wherein the drill tip is a twist drill bit formed by twists of the at least two flutes.

17. An anchor for single penetration applications into a masonry material wherein the anchor does not require the masonry material to be predrilled, the anchor comprising:
a hex-washer head;
a shaft extending from a bottom of the hex-washer head;
a threaded section along the shaft wherein the threads extend outward from an outer diameter of the shaft, wherein the threads are alternating high and low threads, the high threads having serrations that extend to a bottom of the high thread, wherein the serrations extend to a bottom of the serrated high thread, wherein the serrations are oriented vertically along a center axis of the masonry anchor, and wherein serrations are spaced apart at the bottom of the serrated high thread, and wherein the low threads are double low threads without serrations;
a drilling section along the shaft following the threaded section wherein there is no exposed shaft between the threaded section and the drilling section, wherein the drilling section has a same diameter as the shaft, wherein the drilling section comprises at least two flutes for removal of masonry material debris; and
a drill tip at the end of the drilling section wherein the drill tip comprises a material which is harder than the masonry material and different than the material of the drilling section, wherein the material of the drill tip is located in the entire drill tip, a coating on the drill tip, or an attachable portion for the drill tip.

18. The anchor of claim 17, wherein a combined length of the drilling section and the drill tip is at least ¼".

19. The anchor of claim 17, wherein the material of the drill tip is at least one of tungsten carbide, cemented carbide, durium, silicon carbide, or cubic boron nitride.

20. The anchor of claim 17, wherein an outer diameter of the high threads is between ¹⁄₃₂" and ¹⁄₁₆" larger than the outer diameter of the shaft.

\* \* \* \* \*